United States Patent
Masuda (10) Patent No.: US 6,597,872 B2
(45) Date of Patent: Jul. 22, 2003

(54) INVERTED GALILEAN FINDER AND CAMERA

(75) Inventor: Takeshi Masuda, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 09/987,927

(22) Filed: Nov. 16, 2001

(65) Prior Publication Data

US 2002/0090214 A1 Jul. 11, 2002

(30) Foreign Application Priority Data

Nov. 16, 2000 (JP) ........................... 2000-349092

(51) Int. Cl.$^7$ ................................. G03B 13/06
(52) U.S. Cl. ........................................ 396/382
(58) Field of Search ..................... 396/382, 373, 396/6; 359/646

(56) References Cited

U.S. PATENT DOCUMENTS

| | | | |
|---|---|---|---|
| 4,545,655 A | * 10/1985 | Fantone et al. | 396/386 |
| 5,576,782 A | * 11/1996 | Kameyama | 396/6 |
| 5,664,244 A | * 9/1997 | Yamamura et al. | 396/382 |
| 5,982,556 A | * 11/1999 | Koike | 359/646 |

* cited by examiner

Primary Examiner—Christopher Mahoney
(74) Attorney, Agent, or Firm—Young & Thompson (57) ABSTRACT

An inverted Galilean finder is composed of an objective lens of a negative power and an eyepiece of a positive power, which are formed from a polystyrene resin by injection molding. The objective lens has a concave surface oriented to the eyepiece, and the eyepiece has a convex surface oriented to the objective lens. The inverted Galilean finder satisfies the following conditions:

$$-0.75 \leq f1/f2 \leq -0.60$$

$$f1 \leq -22$$

$$-3.2 \leq f1/d \leq -1.5$$

wherein f1 is a focal length of the objective lens, f2 is a focal length of the eyepiece, and "d" is an on-axis surface distance between the concave surface of the objective lens and the convex surface of the eyepiece. The inverted Galilean finder of the present invention provides a magnification of about 0.6 to 0.8.

19 Claims, 14 Drawing Sheets

--------- 587.6 nm : d-LINE
—-—-—-— 435.8 nm : g-LINE

---------- 587.6 nm : d-LINE
— - — - — 435.8 nm : g-LINE

FIG. 12

INVERTED GALILEAN FINDER AND CAMERA

BACKGROUND OF THE INVENTION

1. Field of the Invention

The present invention relates to an inverted Galilean finder that can be mounted in a small space and has a high magnification. The present invention relates also to a camera, especially a lens-fitted photo film unit, that is provided with such an inverted Galilean finder.

2. Background Arts

Lens-fitted photo film units are widely used as a kind of single-use economy cameras. The lens-fitted photo film unit, hereinafter referred to as the film unit, is preloaded with a roll of unexposed photo filmstrip, so the user can take photographs instantly at the purchase of it. After the completion of exposure, the user has only to forward the film unit to a photofinisher, to obtain the developed photo filmstrip and photo-prints made from the photographed pictures. Considering the above nature, being low-price and compact is important for the film unit.

As an optical finder of the film unit, the inverted Galilean finder consisting of a concave objective lens and a convex eyepiece has been used because of its simple structure and compactness. The Galilean finder provides comparatively good performances at a low cost.

However, because of the limit in the mounting space, the Galilean finders used in the conventional film units merely have a finder magnification of about 0.4 to 0.6, which is too small for many users. So it has been desired to provide the film unit with a finder having a larger magnification.

In order to enlarge the magnification of the finder, it is usual using larger objective and eyepiece lenses. But this solution has problems that it needs a larger mounting space and a higher material cost for the finder, so the compactness and cheapness of the film unit are deteriorated.

SUMMARY OF THE INVENTION

In view of the foregoing, an object of the present invention is to provide an inverted Galilean finder that has a high magnification, can be manufactured at a low cost and does not need a larger mounting space. The present invention also has an object to provide a lens-fitted photo film unit provided with such an inverted Galilean finder.

To achieve the above and other objects, an inverted Galilean finder of the present invention is composed of an objective lens of a negative power and an eyepiece of a positive power, the objective lens having a concave surface oriented to the eyepiece, the eyepiece having a convex surface oriented to the objective lens, wherein the inverted Galilean finder satisfies the following conditions:

$$-0.75 \leq f1/f2 \leq -0.60 \tag{1}$$

$$f1 \leq -22 \tag{2}$$

$$-3.2 \leq f1/d \leq -1.5 \tag{3}$$

wherein f1 is a focal length of the objective lens, f2 is a focal length of the eyepiece, and "d" is a surface distance between the concave surface of the objective lens and the convex surface of the eyepiece on an optical axis of the Galilean finder.

The inverted Galilean finder of the present invention provides a magnification of about 0.6 to 0.8. The objective lens and the eyepiece are preferably formed from a polystyrene resin by injection molding. Mounting the inverted Galilean finder satisfying the above conditions provides a compact camera or a lens-fitted photo film unit that has a sufficiently large finder magnification of about 0.6 and 0.8.

If the value f1/f2 is above the upper limit of the first condition (1), the finder magnification cannot be so high, so that the remarkably superior performances to the conventional finder is not achieved. Below the lower limit of the first condition, indeed the finder magnification becomes higher, it is necessary to enlarge the lens size. Thus, the mounting space for the finder would increase, deteriorating the compactness of the film unit.

The second condition: $f1 \leq -22$ defines an upper limit of the focal length of the objective lens having the negative power. When designing a lens system that satisfies the above first condition, power arrangement of the lens system is improved using an objective lens that satisfies the second condition, so it becomes easy to correct aberrations of the lens system. The second condition also makes it easy to define such an air space between the lenses that is suitable for use as a finder mounted in a lens-fitted photo film unit.

The third condition: $-3.2 \leq f1/d \leq -1.5$ defines a condition relating to the air space between the concave surface of the objective lens and the convex surface of the eyepiece on the optical axis, on the premise that these lenses constitute a lens system that satisfies the above first and second conditions. Above the upper limit of the third condition, the surface distance "d" and thus the mounting space for the finder become so large that the lens-fitted photo film unit would loose the compactness. Below the lower limit of the third condition, the refractive power of the objective lens becomes so small that it would be necessary to enlarge the finder mounting space. Otherwise, the surface distance "d" becomes so small that it would be hard to design composition of the two lenses. In either case, it becomes disadvantageous for the lens system to serve as a finder.

BRIEF DESCRIPTION OF THE DRAWINGS

The above and other objects and advantages of the present invention will become apparent from the following detailed description of the preferred embodiments when read in association with the accompanying drawings, which are given by way of illustration only and thus are not limiting the present invention. In the drawings, like reference numerals designate like or corresponding parts throughout the several views, and wherein.

DETAILED DESCRIPTION OF THE EMBODIMENTS

Figure 1:
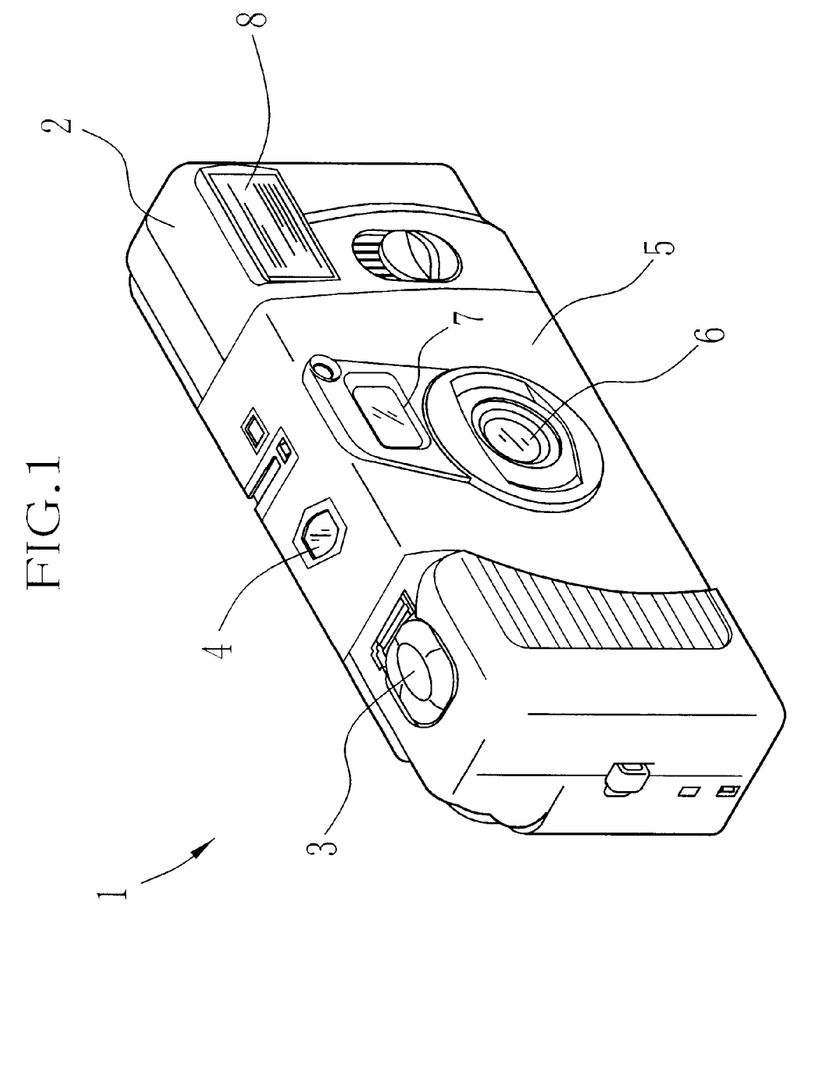
FIG. 1 shows a perspective view of a lens-fitted photo film unit according to an embodiment of the present invention.

In FIG. 1, a lens-fitted photo film unit 1 has a camera body 2 that is substantially parallelepiped. The camera body 2 has a shutter button 3 and a counter window 4 showing the available number of exposures on its top side. The camera body 2 is wrapped with an ornamental label, and a taking lens 6 is exposed to the front side. A finder objective window 7 is formed above the taking lens 6. A flash projector 8 projects a flash light at a flash photography.

Figure 2:
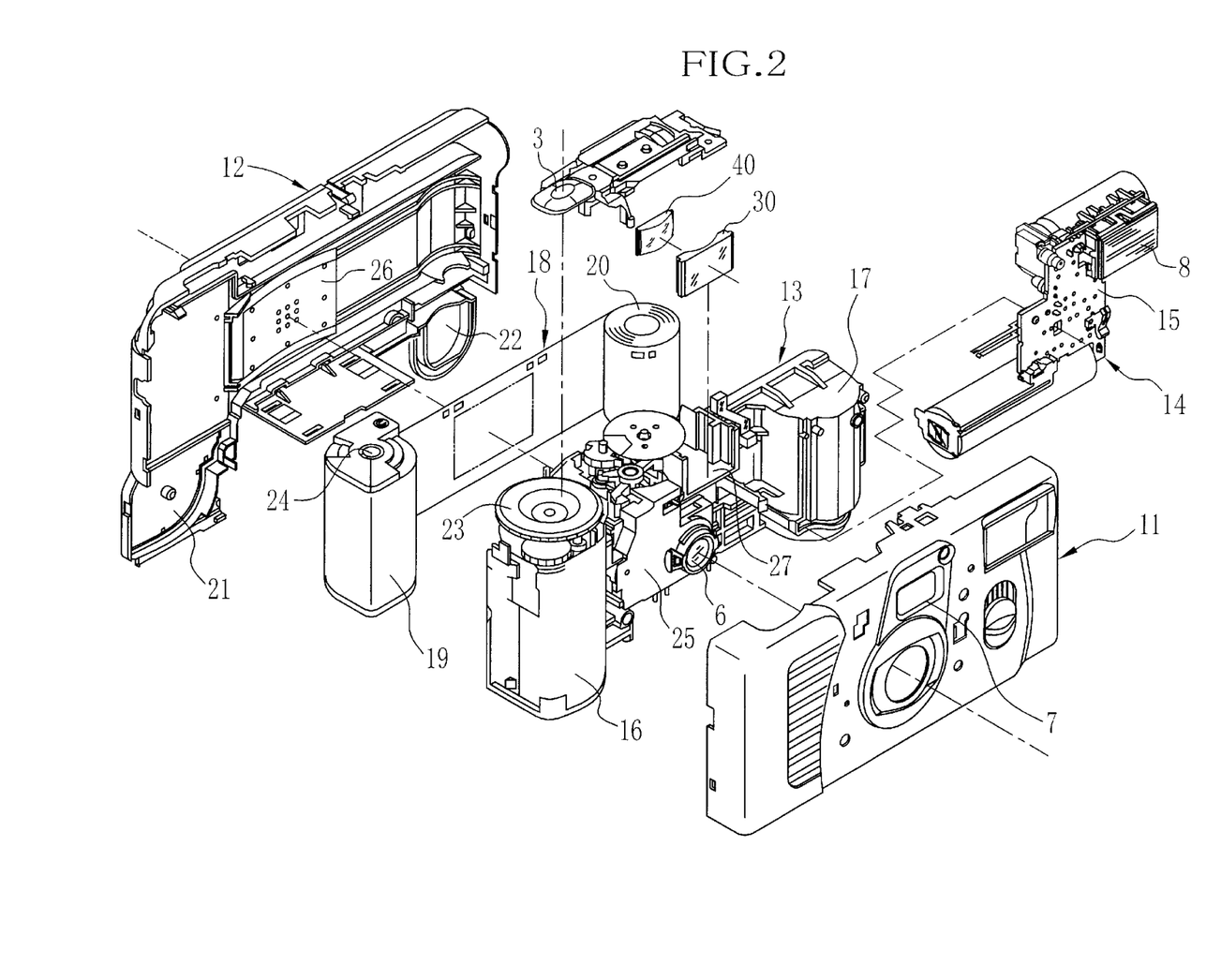
FIG. 2 shows an exploded perspective view of the lens-fitted photo film unit of FIG. 1.

As shown in FIG. 2, the film unit 1 has a unit main body portion 13 whose front and rear are covered with a front cover 11 and a rear cover 12 respectively. The front and rear cover 11 and 12 and the main body portion 13 are formed from plastics. A flash device 14, which has various circuit elements mounted on a circuit board 15, is attached to the unit main body portion 13.

The unit main body portion 13 is integrally formed with a cartridge chamber 16 and a film chamber 17. The cartridge chamber 16 holds a film cartridge 19 from which an unexposed photo filmstrip 18 is pulled out, whereas the film chamber 17 holds the unexposed photo filmstrip 18 in the form of a roll 20. Open bottoms of the cartridge chamber 16 and the film chamber 17 are covered with bottom lids 21 and 22 respectively. A film winding wheel 23 is rotatably mounted on top of the cartridge chamber 16, and is engaged with a spool 24 of the film cartridge 19. Rotating the film winding wheel 23 drives the spool 24 to rewind the photo filmstrip 18 into the film cartridge 19.

An exposure chamber is also formed integrally with the unit main body 13 between the cartridge chamber 16 and the film chamber 17, and an exposure unit 25 is mounted in front of the exposure chamber. The taking lens 6 is placed in front of a not-shown shutter aperture that is formed through the exposure unit 25. A not-shown shutter blade is placed behind the shutter aperture and the taking lens 6. A not-shown exposure opening is formed on the rear side of the exposure chamber. The exposure opening defines an exposure area of one picture frame on the photo filmstrip 18 that is held between the exposure opening and a film backing surface 26 that is formed on the rear cover 12. While the shutter blade opens the shutter aperture, an image of a subject is formed on the photo filmstrip 18 through the taking lens 6.

The exposure unit 25 is provided with a well-known shutter mechanism that actuates the shutter blade to open and close the shutter opening, and a finder frame 27. The shutter mechanism is charged as the photo filmstrip 18 is wound up by one frame by rotating the film winding wheel 23, and is released in response to the shutter button 3 being pressed, causing the shutter blade to make an open-close operation for an exposure.

An objective lens 30 and an eyepiece 40 are fitted in the finder frame 27. The objective lens 30 and the eyepiece 40 are formed from a plastic material, e.g. a polystyrene resin, by injection-molding. The objective lens 30 is a concave lens, and the eyepiece 40 is a convex lens, so these lenses constitute an inverted Galilean finder optical system. The following description shows several examples of the inverted Galilean finder optical system of the present invention, wherein the lens elements are formed from a polystyrene resin. The eye point is located 10~18 mm from the eyepiece, and the air space between the eyepiece and the objective lens is about 14 mm. In order to obtain a sharp field of view, aspherical lenses suppressing aberrations are used as the lens elements.

EXAMPLE 1

Figure 3:
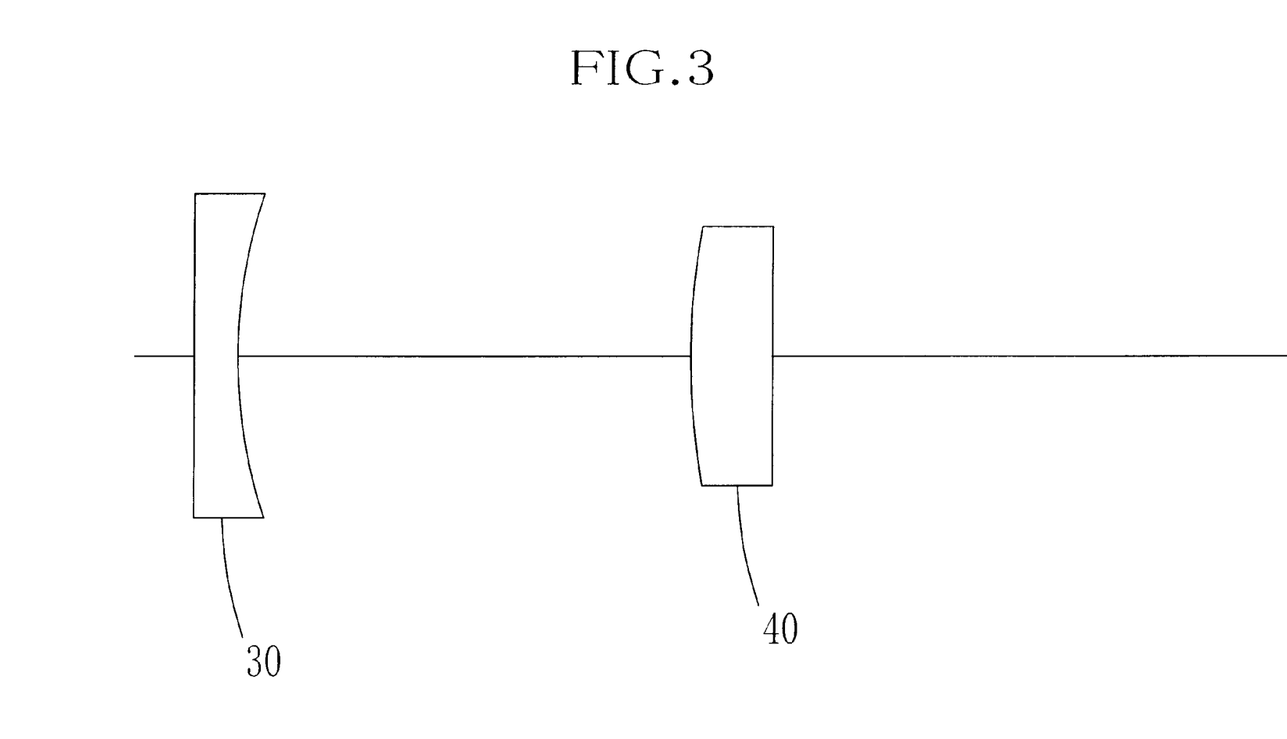
FIGS. 3, 6, 9 and 12 schematically show lens systems according to Examples 1, 2, 3 and 4 of the present invention.

FIG. 3 shows a composition of Example 1 of the inverted Galilean finder optical system of the present invention. Lens data of the objective lens 30 and the eyepiece 40 of Example 1 is shown in Table 1.

In Table 1 and other tables, "No." represents a surface serial number of a respective curved surface of the lens elements in the order from the object side, "R" represents a radius of curvature of the respective curved surface, expressed in the unit of millimeter. The surface distance means a thickness of a respective lens on the optical axis or an air space between adjacent lenses on the optical axis, expressed in the unit of millimeter. "Nd" represents a the refractive index of each lens with respect to d-line (wavelength of 587.6 nm). The lens surface allocated with "*" is an aspherical surface that satisfies the following condition:

$$Z=ch^2/[1+\{1-(1+k)c^2h^2\}^{1/2}]+Ah^2+Bh^6+Ch^8+Dh^{10}$$

wherein "c"=1/R (R=radius of curvature), "h" is the height from the optical axis, and "k", "A", "B", "C" and "D" are aspherical coefficients. The aspherical coefficients of the second surface of Example 1 are shown in Table 2.

TABLE 1

| No. | R | SURFACE DISTANCE | Nd | Abbe Number |
|---|---|---|---|---|
| 1 | INFINITY | 1.35 | 1.59000 | 30.9 |
| 2 | *15.679 | 13.95 | | |
| 3 | 23.289 | 2.5 | 1.59000 | 30.9 |
| 4 | 364.183 | | | |

TABLE 2

| k | 0 |
|---|---|
| A | −0.152561E−04 |
| B | −0.757461E−07 |
| C | −0.330640E−10 |
| D | −0.122694E−11 |

In Example 1, the focal length f1 of the objective lens 30 and the focal length f2 of the eyepiece 40 are:

$f1=-26.57$ mm $f2=40.06$ mm.

As shown in Table 1, the surface distance "d" between the second surface and the third surface, i.e. the air space between the concave surface of the objective lens and the convex surface of the eyepiece is:

$d=13.95$ mm.

Therefore, in Example 1, f1/f2=−0.63, f1/d=−1.90.

Accordingly, the characteristic values of the present invention satisfy all the three conditions:

$$-0.75 \leq f1/f2 \leq -0.60 \quad (1)$$

$$f1 \leq -22 \quad (2)$$

$$-3.2 \leq f1/d \leq -1.5 \quad (3)$$

Figure 4A:
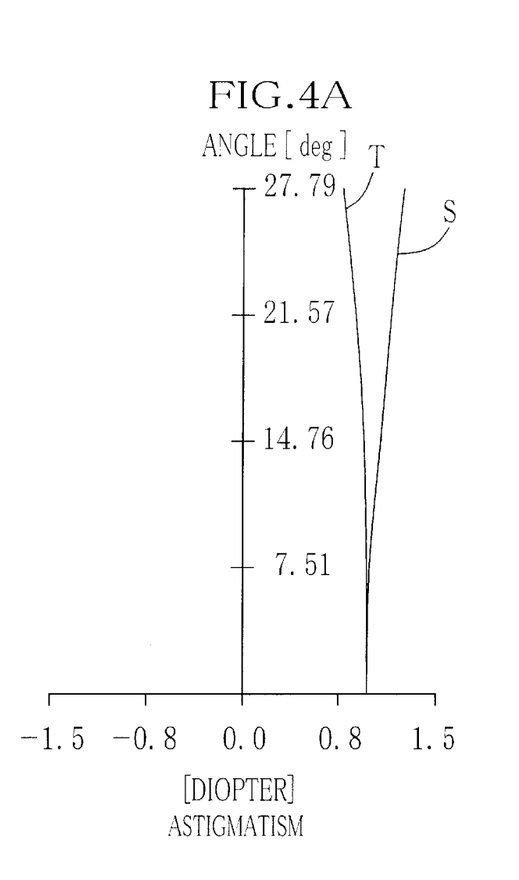
FIGS. 4, 7, 10 and 13 are graphs showing longitudinal aberrations of Examples 1 to 4 respectively.
Figure 4B:
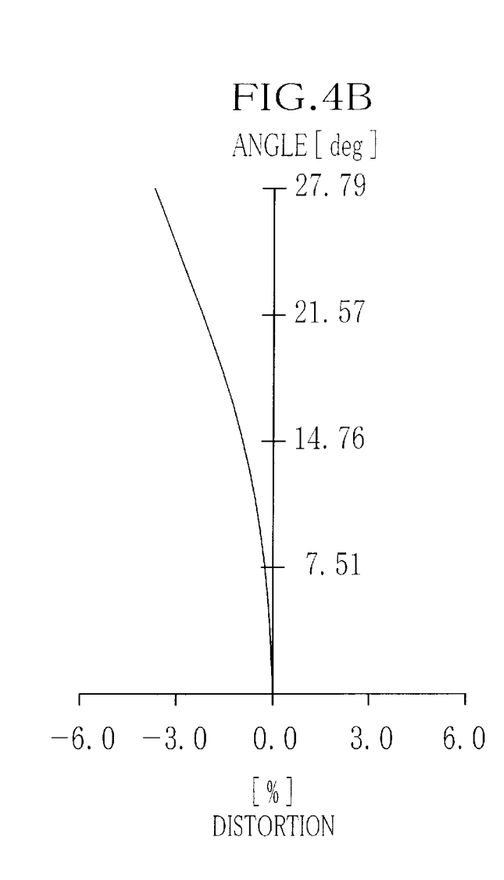
Figure 5A:
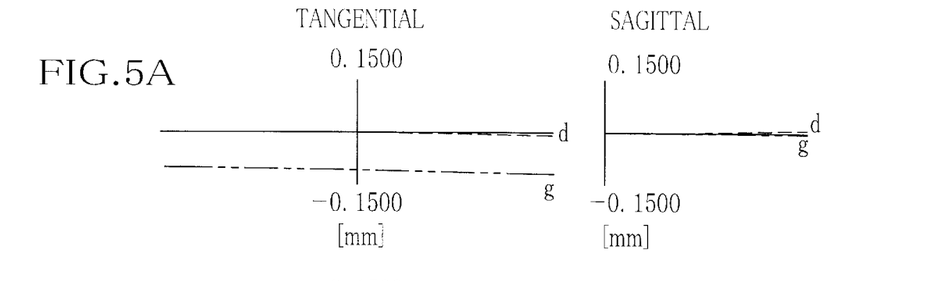
FIGS. 5, 8, 11 and 14 are graphs showing transverse aberrations of Examples 1 to 4 respectively.
Figure 5B:
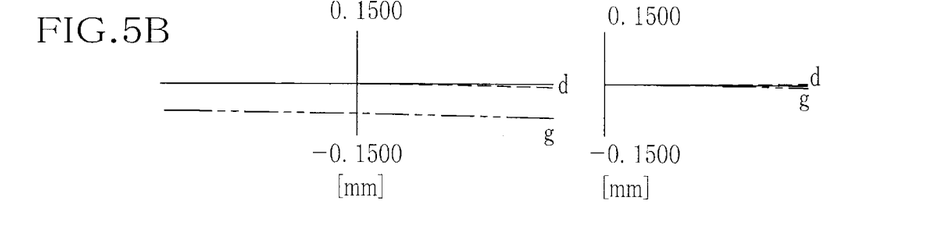
Figure 5C:
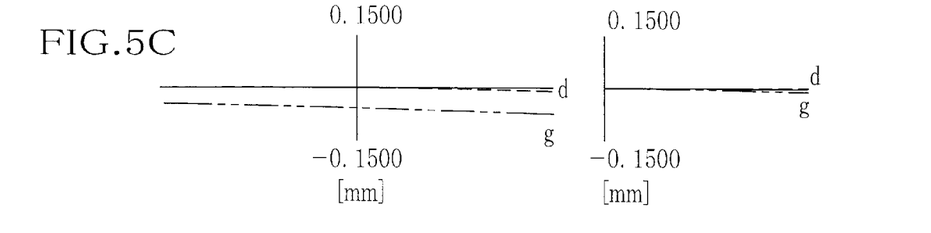
Figure 5D:
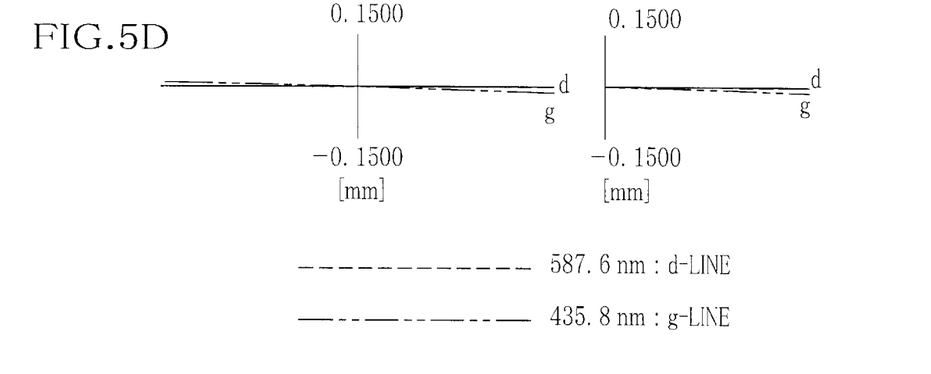

Various aberrations of Example 1 are illustrated in FIGS. 4 and 5. In FIG. 4A, a curve S shows an astigmatism with respect to the sagittal image surface, and a curve T shows an astigmatism with respect to the tangential image surface. FIGS. 5A, 5B, 5C and 5D respectively show transverse aberrations at relative field heights of 1.00, 0.84, 0.54 and 0.00.

Example 1 provides an inverted Galilean finder having a magnification of 0.65 and a sharp field of view where the aberrations are well compensated as shown in FIGS. 4 and 5.

EXAMPLE 2

Figure 6:
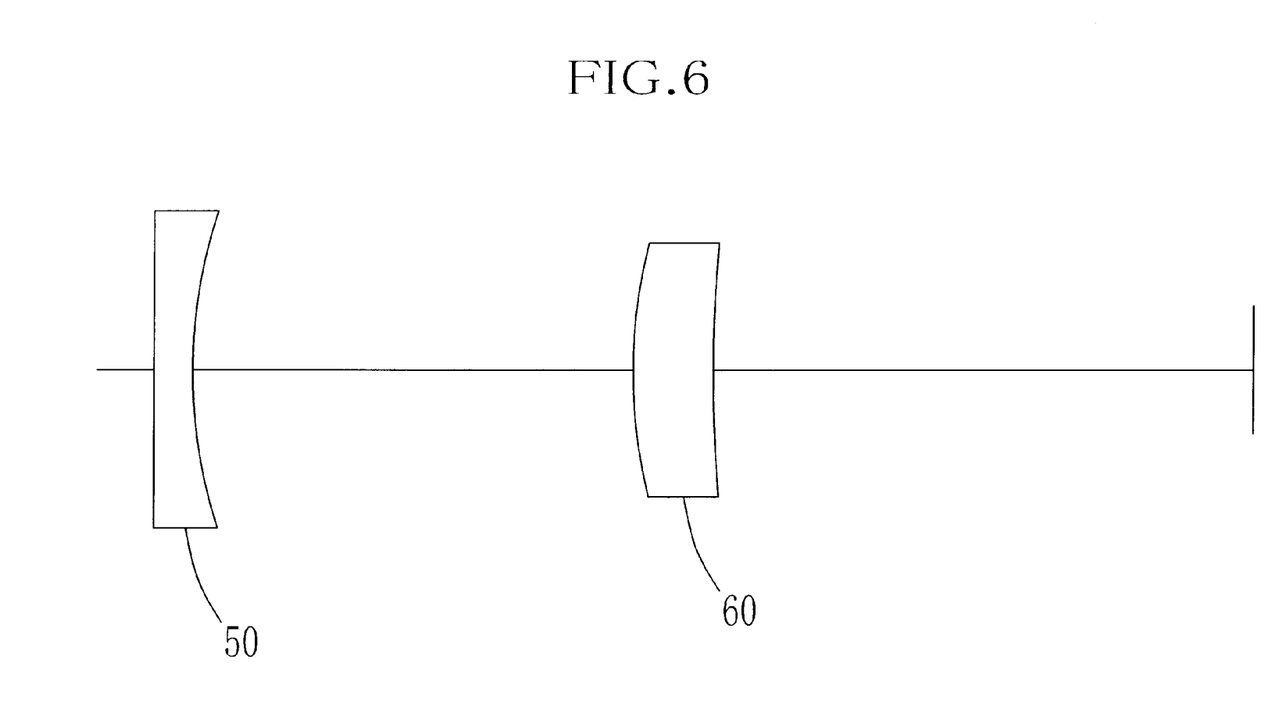

FIG. 6 shows a composition of Example 2 of the inverted Galilean finder optical system of the present invention. Lens data of the objective lens 50 and the eyepiece 60 of Example 2 is shown in Table 3.

TABLE 3

| No. | R | SURFACE DISTANCE | Nd | Abbe Number |
|---|---|---|---|---|
| 1 | INFINITY | 1.2 | 1.59000 | 30.9 |
| 2 | *16.165 | 13.8 | | |
| 3 | *16.370 | 2.5 | 1.59000 | 30.9 |
| 4 | 45.551 | | | |

The aspherical coefficients of the second and third surfaces of Example 2 are shown in Table 4.

TABLE 4

| | SECOND SURFACE | THIRD SURFACE |
|---|---|---|
| k | 0 | 0 |
| A | −0.359154E-04 | −0.249269E-04 |
| B | −0.590935E-07 | 0 |
| C | 0 | 0 |
| D | 0 | 0 |

In Example 2, the focal length f1 of the objective lens 50 and the focal length f2 of the eyepiece 60 are:

$f1 = -27.40$ mm $f2 = 41.98$ mm.

As shown in Table 3, the surface distance "d" between the second surface and the third surface, i.e. the air space between the concave surface of the objective lens and the convex surface of the eyepiece is:

$d = 13.8$ mm.

Therefore, in Example 2, $f1/f2 = -0.65$, $f1/d = -1.99$.

Accordingly, the characteristic values of the present invention satisfy all the above three conditions.

Figure 7A:
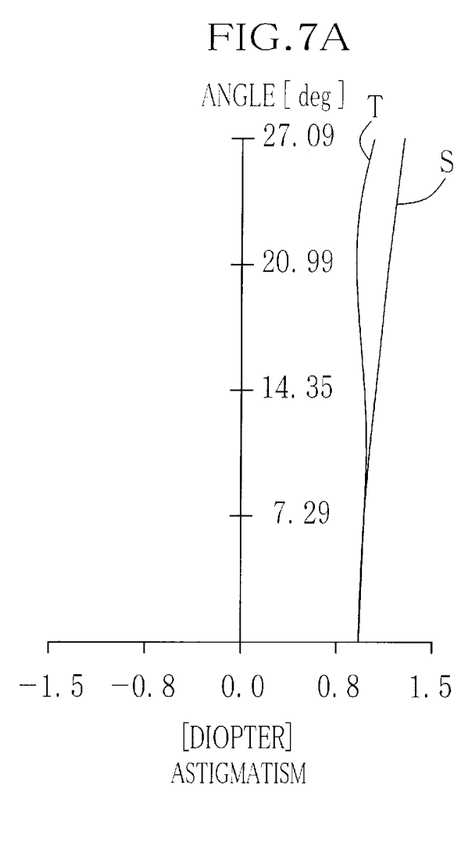
Figure 7B:
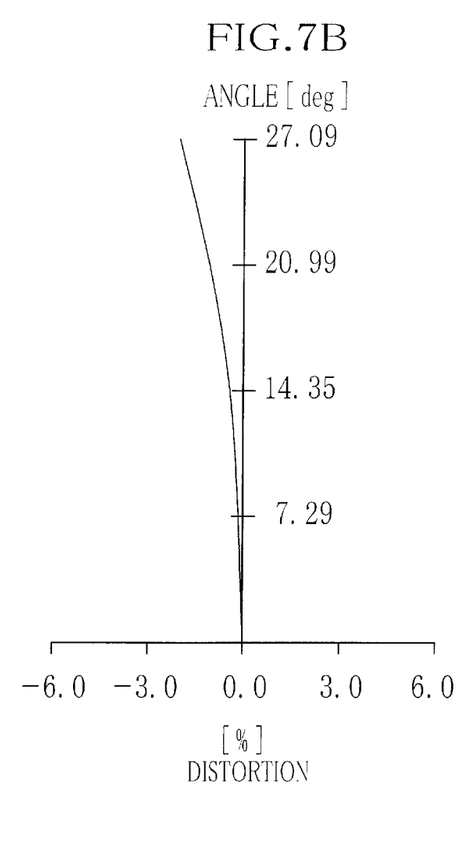
Figure 8A:
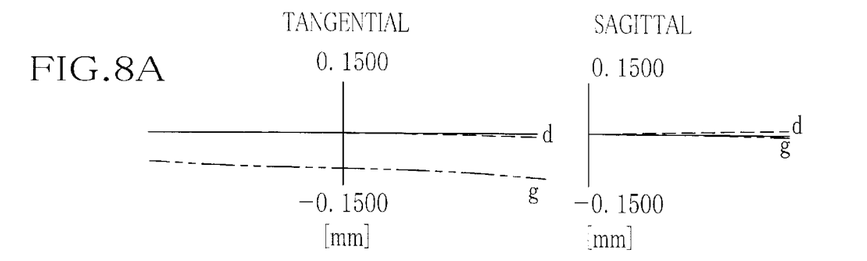
Figure 8B:
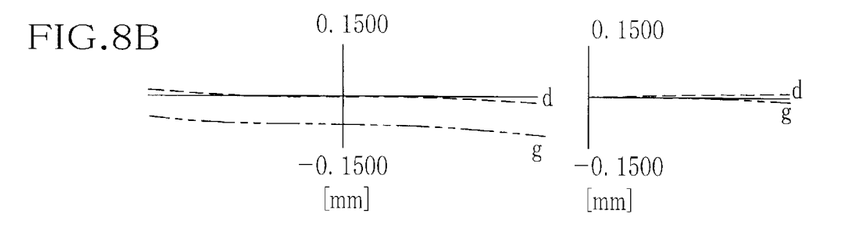
Figure 8C:
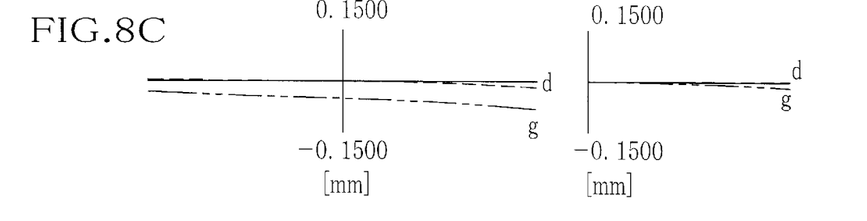
Figure 8D:
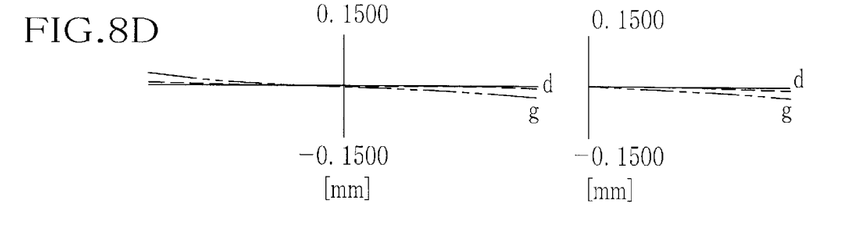

Various aberrations of Example 2 are illustrated in FIGS. 7 and 8. In FIG. 7A, a curve S shows an astigmatism with respect to the sagittal image surface, and a curve T shows an astigmatism with respect to the tangential image surface. FIGS. 8A, 8B, 8C and 8D respectively show transverse aberrations at relative field heights of 1.00, 0.83, 0.55 and 0.00.

Example 2 provides an inverted Galilean finder having a magnification of 0.67 and a sharp field of view where the aberrations are well compensated as shown in FIGS. 7 and 8.

EXAMPLE 3

Figure 9:
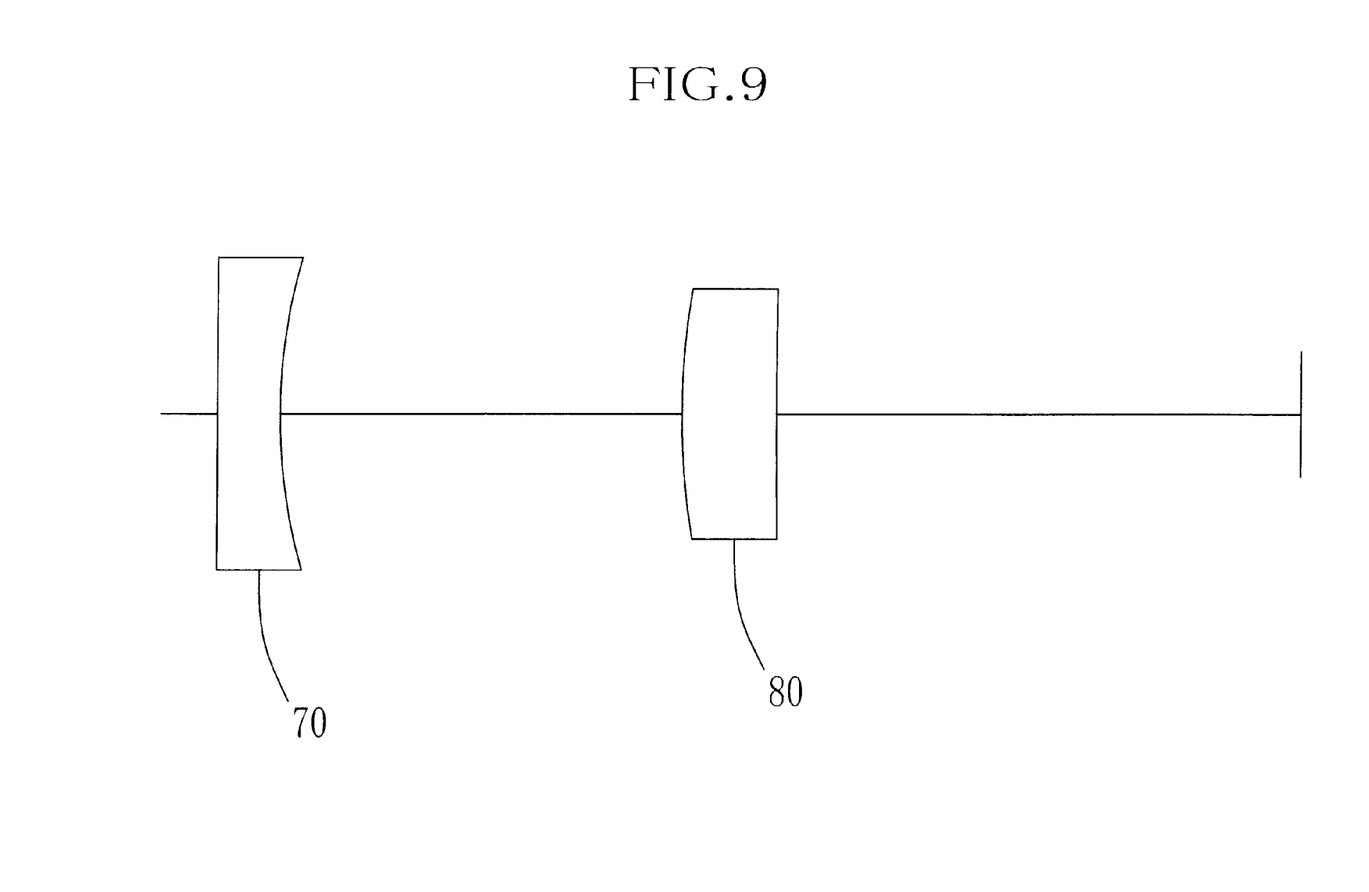

FIG. 9 shows a composition of Example 3 of the inverted Galilean finder optical system of the present invention. Lens data of the objective lens 70 and the eyepiece 80 of Example 3 is shown in Table 5.

TABLE 5

| No. | R | SURFACE DISTANCE | Nd | Abbe Number |
|---|---|---|---|---|
| 1 | INFINITY | 2.0 | 1.59000 | 30.9 |
| 2 | *18.164 | 12.8 | | |
| 3 | 24.258 | 3.0 | 1.59000 | 30.9 |
| 4 | 251.609 | | | |

The aspherical coefficients of the second surface of Example 3 are shown in Table 6.

TABLE 6

| k | 0 |
|---|---|
| A | −0.916806E-05 |
| B | −0.151759E-07 |
| C | −0.198005E-09 |
| D | 0.564390E-12 |

In Example 3, the focal length f1 of the objective lens 70 and the focal length f2 of the eyepiece 80 are:

$f1 = -30.79$ mm $f2 = 45.28$ mm.

As shown in Table 5, the surface distance "d" between the second surface and the third surface, i.e. the air space between the concave surface of the objective lens and the convex surface of the eyepiece on the optical axis is:

$d = 12.8$ mm.

Therefore, in Example 3, $f1/f2 = -0.68$, $f1/d = -2.41$.

Accordingly, the characteristic values of the present invention satisfy all the above three conditions (1) to (3).

Figure 10A:
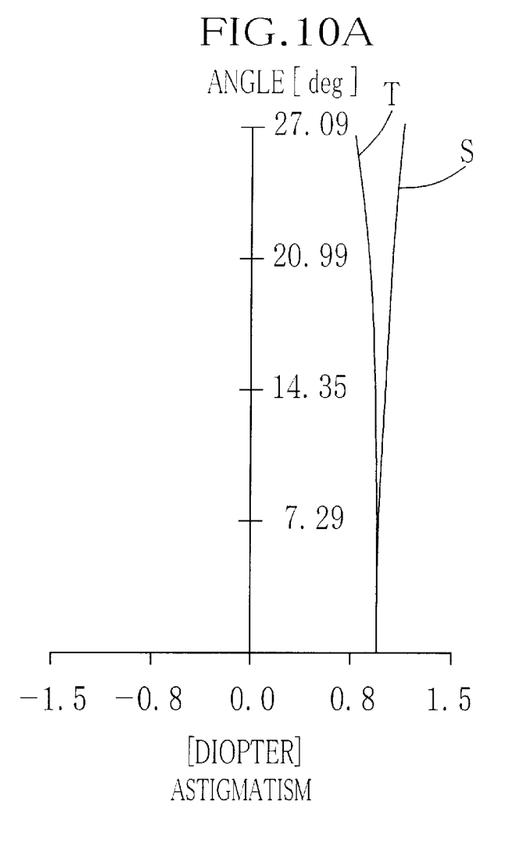
Figure 10B:
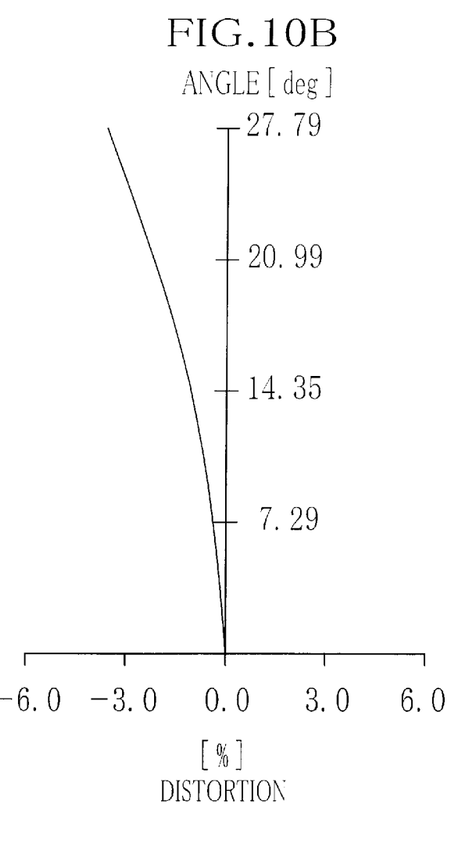
Figure 11A:
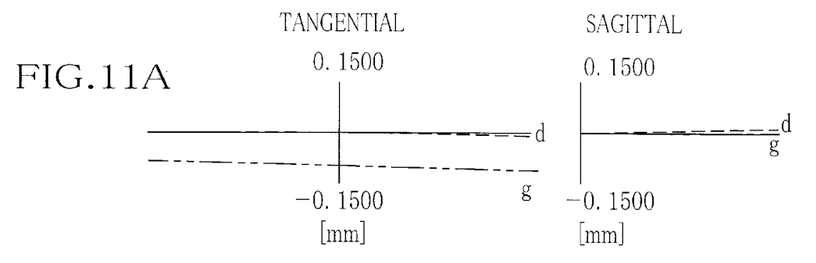
Figure 11B:
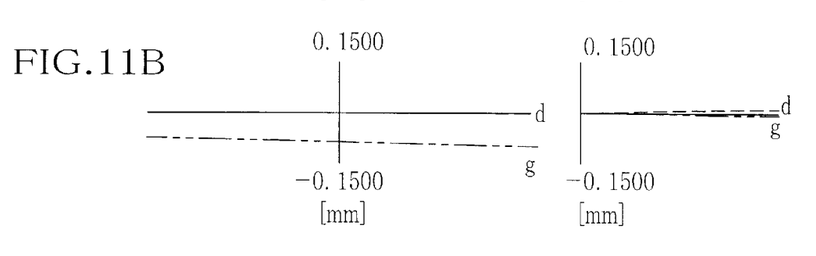
Figure 11C:
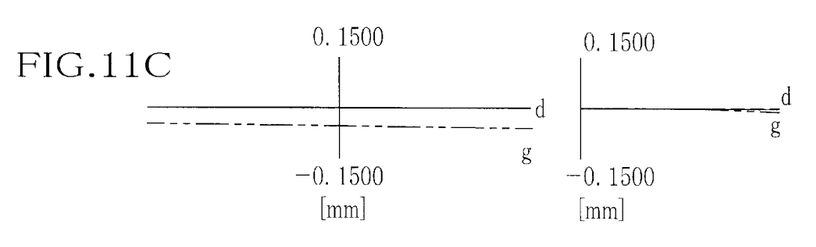
Figure 11D:
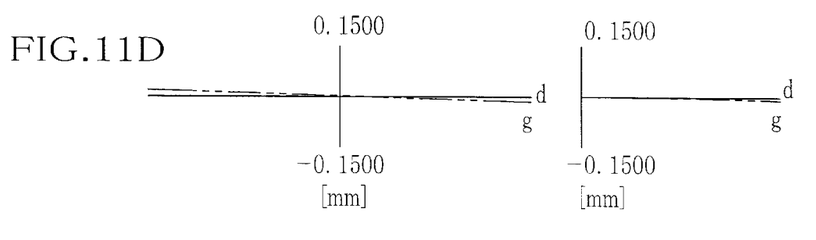

Various aberrations of Example 3 are illustrated in FIGS. 10 and 11. In FIG. 10A, a curve S shows an astigmatism with respect to the sagittal image surface, and a curve T shows an astigmatism with respect to the tangential image surface. FIGS. 11A, 11B, 11C and 11D respectively show transverse aberrations at relative field heights of 1.00, 0.83, 0.55, and 0.00.

Example 3 provides an inverted Galilean finder having a magnification of 0.70 and a sharp field of view where the aberrations are well compensated as shown in FIGS. 7 and 8.

EXAMPLE 4

Figure 12:
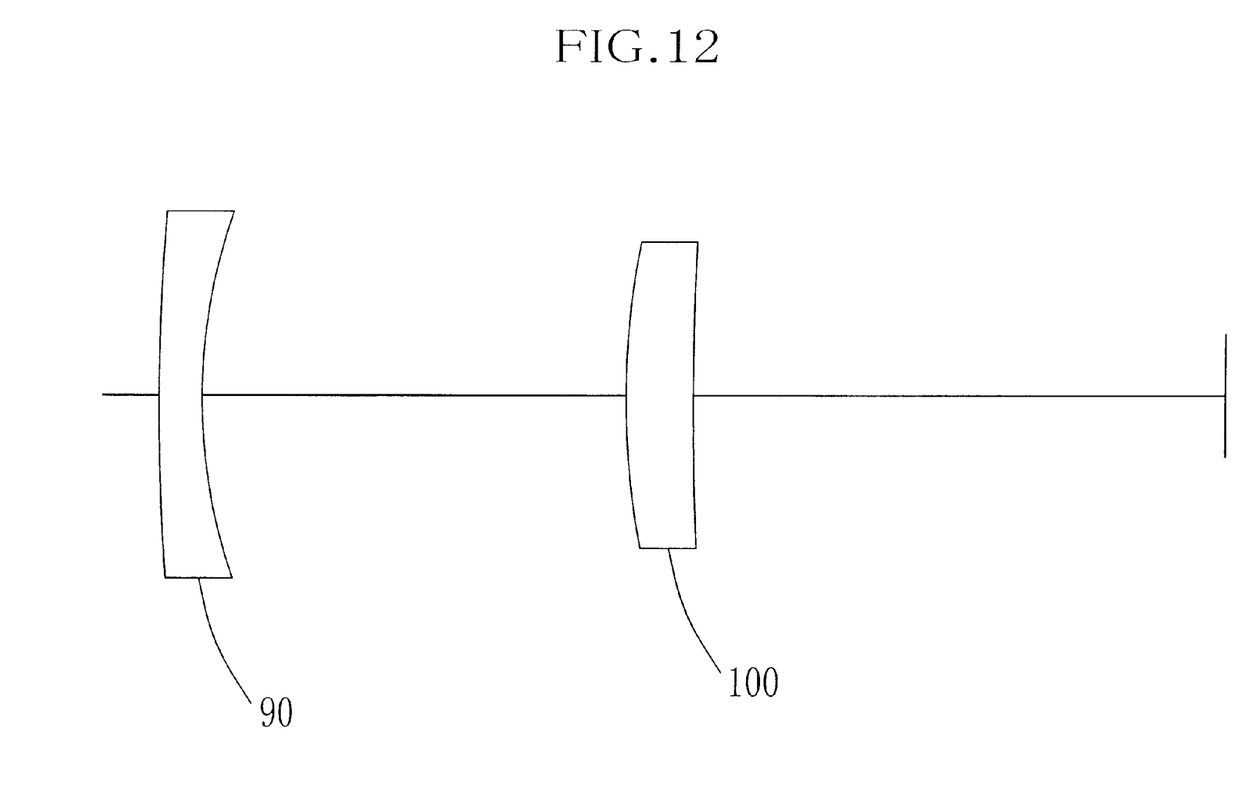

FIG. 12 shows a composition of Example 4 of the inverted Galilean finder optical system of the present invention. Lens data of the objective lens 90 and the eyepiece 100 of Example 4 is shown in Table 7.

TABLE 7

| No. | R | SURFACE DISTANCE | Nd | Abbe Number |
|---|---|---|---|---|
| 1 | 80.0 | 1.4 | 1.59000 | 30.9 |
| 2 | *18.293 | 13.8 | | |
| 3 | *25.217 | 2.2 | 1.59000 | 30.9 |
| 4 | 100.0 | | | |

The aspherical coefficients of the second and third surfaces of Example 4 are shown in Table 8.

TABLE 8

|   | SECOND SURFACE | THIRD SURFACE |
|---|---|---|
| k | 0 | 0 |
| A | -0.100414E-04 | -0.516066E-05 |
| B | -0.502635E-08 | 0.801960E-07 |
| C | 0.695539E-10 | 0 |
| D | 0 | 0 |

In Example 4, the focal length f1 of the objective lens 90 and the focal length f2 of the eyepiece 100 are:

$$f1 = -40.54 \text{ mm}$$

$$f2 = 56.54 \text{ mm}.$$

As shown in Table 7, the surface distance "d" between the second surface and the third surface, i.e. the air space between the concave surface of the objective lens 90 and the convex surface of the eyepiece 100 on the optical axis is:

$$d = 13.8 \text{ mm}.$$

Therefore, in Example 4, f1/f2=−0.72, f1/d=−2.94.

Accordingly, the characteristic values of the present invention satisfy all the above three conditions (1) to (3).

Figure 13A:
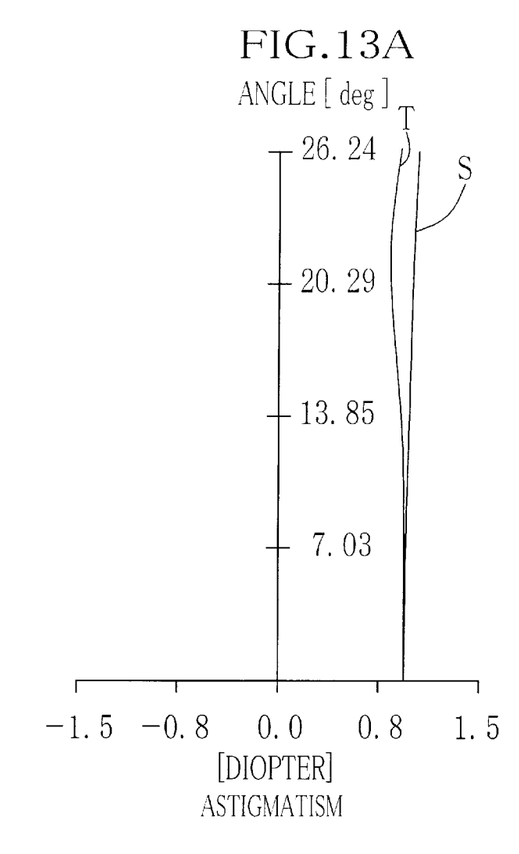
Figure 13B:
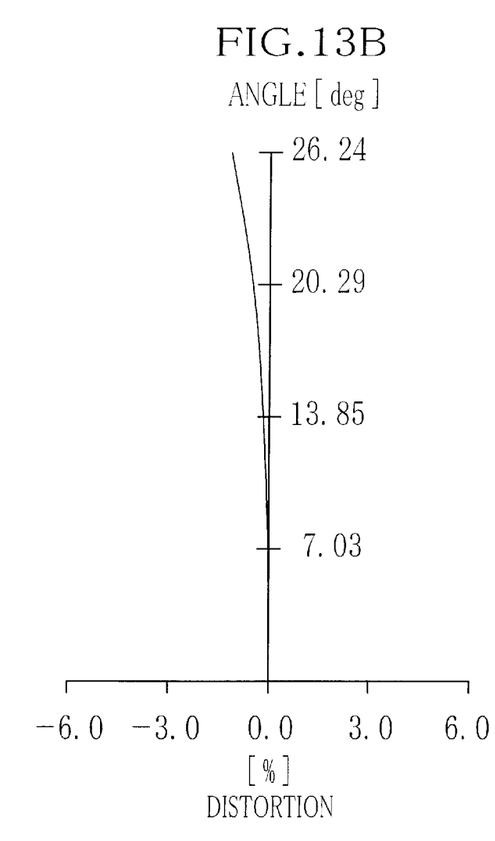
Figure 14A:
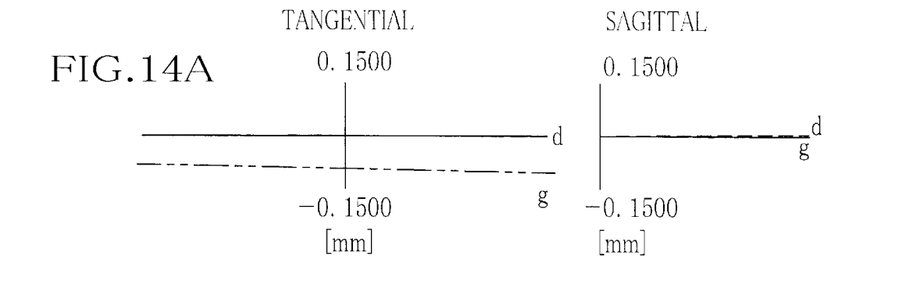
Figure 14B:
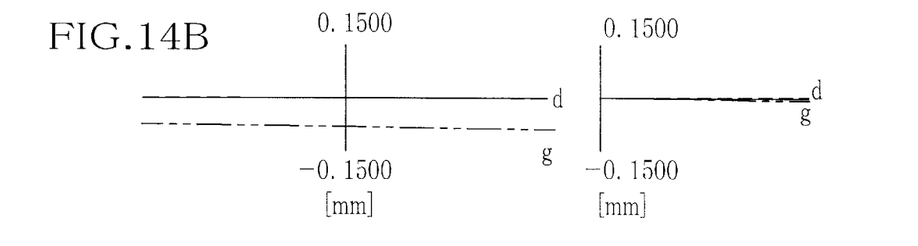
Figure 14C:
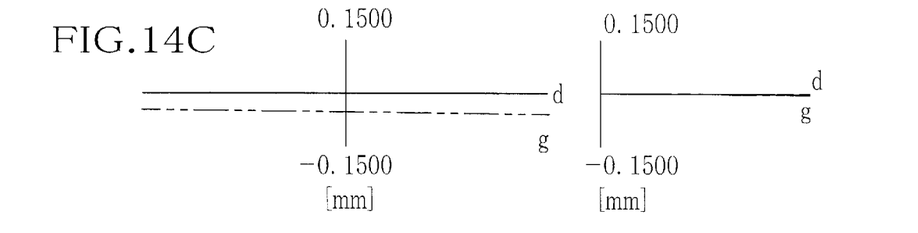
Figure 14D:
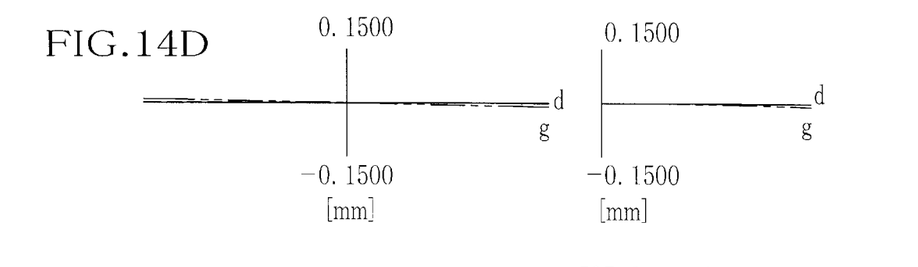

Various aberrations of Example 4 are illustrated in FIGS. 13 and 14. In FIG. 13A, a curve S shows an astigmatism with respect to the sagittal image surface, and a curve T shows an astigmatism with respect to the tangential image surface. FIGS. 14A, 14B, 14C and 14D respectively show transverse aberrations at relative field heights of 1.00, 0.82, 0.56 and 0.00.

Example 4 provides an inverted Galilean finder having a magnification of 0.74 and a sharp field of view where the aberrations are well compensated as shown in FIGS. 13 and 14.

Although the present invention has been described with respect to the lens-fitted photo film unit, the inverted Galilean finder of the present invention is applicable to those cameras which allow the user to load a film cartridge repeatedly, and which are required to be economy and compact.

The present invention is not to be limited to the above embodiment and examples but, on the contrary, various modifications will be possible to those skilled in the art without departing from the scope of claims appended hereto.

What is claimed is:

1. An inverted Galilean finder composed of an objective lens of a negative power and an eyepiece of a positive power, the objective lens having a concave surface oriented to the eyepiece, the eyepiece having a convex surface oriented to the objective lens, said inverted Galilean finder satisfying the following conditions:

$$-0.75 \leq f1/f2 \leq -0.60$$

$$f1 \leq -26.57$$

$$-3.2 \leq f1/d \leq -1.5$$

wherein f1 is a focal length of the objective lens, f2 is a focal length of the eyepiece, and "d" is a surface distance between the concave surface of the objective lens and the convex surface of the eyepiece on an optical axis of said Galilean finder.

2. An inverted Galilean finder as recited in claim 1, wherein the objective lens and the eyepiece of said inverted Galilean finder are formed from plastics by injection molding.

3. The finder of claim 1, wherein $f1 \leq -27.4$.
4. The finder of claim 1, wherein $f1 \leq -30.79$.
5. The finder of claim 1, wherein $f1 \leq -40.54$.
6. The finder of claim 1, wherein $f1/f2 \leq -0.66$.
7. The finder of claim 1, wherein $f1/f2 \leq -0.65$.
8. The finder of claim 1, wherein $f1/f2 \leq -0.68$.
9. The finder of claim 1, wherein $f1/f2 \leq -0.72$.

10. A camera provided with an inverted Galilean finder that is composed of an objective lens of a negative power and an eyepiece of a positive power, the objective lens having a concave surface oriented to the eyepiece, the eyepiece having a convex surface oriented to the objective lens, said inverted Galilean finder satisfying the following conditions:

$$-0.75 \leq f1/f2 \leq -0.60$$

$$f1 \leq -26.57$$

$$-3.2 \leq f1/d \leq -1.5$$

wherein f1 is a focal length of the objective lens, f2 is a focal length of the eyepiece, and "d" is a surface distance between the concave surface of the objective lens and the convex surface of the eyepiece on an optical axis of said Galilean finder.

11. A camera as recited in claim 10, wherein the objective lens and the eyepiece of said inverted Galilean finder are formed from plastics by injection molding.

12. A camera as recited in claim 11, wherein said camera comprises a main body portion having a cartridge chamber and a film chamber as an integral part, and a film cartridge and a roll of unexposed photo filmstrip as pulled out from said film cartridge are respectively loaded in said cartridge chamber and said film chamber in a manufacturing process of said camera, and the objective lens and the eyepiece of said inverted Galilean finder are fitted in a finder frame that is provided on said main body portion.

13. The camera of claim 10, wherein $f1 \leq -27.4$.
14. The camera of claim 10, wherein $f1 \leq -30.79$.
15. The camera of claim 10, wherein $f1 \leq -40.54$.
16. The camera of claim 10, wherein $f1/f2 \leq -0.66$.
17. The camera of claim 10, wherein $f1/f2 \leq -0.65$.
18. The camera of claim 10, wherein $f1/f2 \leq -0.68$.
19. The camera of claim 10, wherein $f1/f2 \leq -0.72$.

* * * * *